(12) United States Patent
Shin

(10) Patent No.: US 7,293,527 B2
(45) Date of Patent: Nov. 13, 2007

(54) VENT PLUG FOR MILKING LINER

(75) Inventor: Jin-Woong Shin, Copley, OH (US)

(73) Assignee: Lauren Agrisystems, Ltd., New Philadelphia, OH (US)

(*) Notice: Subject to any disclaimer, the term of this patent is extended or adjusted under 35 U.S.C. 154(b) by 363 days.

(21) Appl. No.: 10/987,696

(22) Filed: Nov. 12, 2004

(65) Prior Publication Data

US 2005/0284378 A1    Dec. 29, 2005

Related U.S. Application Data

(60) Provisional application No. 60/583,705, filed on Jun. 29, 2004.

(51) Int. Cl.
A01J 3/00 (2006.01)

(52) U.S. Cl. .................................. 119/14.47

(58) Field of Classification Search .. 119/14.01–14.03, 119/14.08, 14.5, 14.51, 14.52, 14.53, 14.18, 119/14.36, 14.44, 14.46, 14.47, 14.48
See application file for complete search history.

(56) References Cited

U.S. PATENT DOCUMENTS

| | | | |
|---|---|---|---|
| 488,282 A | 12/1892 | Mehring | |
| 3,255,732 A * | 6/1966 | Raht | 119/14.52 |
| 3,476,085 A * | 11/1969 | Noorlander | 119/14.36 |
| 3,482,547 A * | 12/1969 | Maier | 119/14.36 |
| 3,659,558 A | 5/1972 | Noorlander | |
| 3,931,795 A * | 1/1976 | Duncan | 119/14.38 |
| 3,967,586 A | 7/1976 | Noorlander | |
| 3,967,587 A | 7/1976 | Noorlander | |
| 4,263,875 A | 4/1981 | Maier | |
| 4,303,038 A | 12/1981 | Thompson | |
| 4,441,454 A | 4/1984 | Happel | |
| 4,604,969 A | 8/1986 | Larson | |
| 5,161,482 A * | 11/1992 | Griffin | 119/14.02 |
| 6,055,931 A * | 5/2000 | Sanford, Jr. | 119/14.36 |
| 6,308,655 B1 * | 10/2001 | Oosterling | 119/14.08 |
| 6,631,694 B1 | 10/2003 | Chowdhury | |
| 6,745,718 B1 | 6/2004 | Chowdhury | |
| 6,755,153 B1 | 6/2004 | Chowdhury | |
| 6,776,120 B1 | 8/2004 | Chowdhury | |
| 6,796,272 B1 | 9/2004 | Chowdhury | |

FOREIGN PATENT DOCUMENTS

| | | |
|---|---|---|
| EP | 1334656 A | 8/2003 |
| FR | 1525716 A | 5/1968 |

* cited by examiner

*Primary Examiner*—Thomas Price
(74) *Attorney, Agent, or Firm*—Zollinger & Burleson Ltd.

(57) ABSTRACT

A vent plug for a milking liner has an inlet that faces the outer surface of the liner. The position of the vent inlet reduces the likelihood that it will become clogged with debris from the floor of the milking parlor. In one embodiment, the vent plug has a plurality of redundant inlets that allow the vent plug to function if one of the inlets becomes clogged. In another embodiment, the inlet is angled at a nonparallel angle with respect to the vent passage.

11 Claims, 7 Drawing Sheets

VENT PLUG FOR MILKING LINER

CROSS REFERENCE TO RELATED APPLICATIONS

This application claims priority from U.S. Provisional Patent Application Ser. No. 60/583,705 filed Jun. 29, 2004; the disclosures of which are incorporated herein by reference.

BACKGROUND OF THE INVENTION

1. Technical Field

This invention generally relates to milking apparatus that use milking liners to draw milk from the teat. More particularly, the invention is related to the vent used with the milking liner. Specifically, the invention relates to anticlogging vent plugs that may be selectively installed into and removed from milking liners.

2. Background Information

Automatic milking machines have been used to extract milk from different mammals through most of the past century. Most of these machines include a claw that typically has four nipples that are connected to teat cup assemblies that are attached to the teats. The teat cup assemblies include a rigid (hard plastic or metal) shell with a resilient, elastomeric milking liner (also known as a milking inflation) disposed within the shell. A short milk tube extends from the liner. A vacuum source is applied to the short milk tube and an alternating vacuum is applied to the shell to cause the liners to collapse and expand and thereby massage the teats and suck milk from the teats. The milk flows from the liners, into the short milk tube, to the nipples of the claw, and from there through a conduit to a collection tank.

The liner is one of the few components of an automatic milking machine that comes into direct contact with the cow. Liners collapse and expand to massage the teat to cause milk to flow. Liner performance may be maximized with the proper pulsation ratio. Numerous milking inflation designs have been developed for collapsing on the teat in different manners. The art desires an inflation having an open, relatively large, readily collapsible barrel that uniformly collapses around the teat to provide effective and comfortable milking. The structure of the barrel should provide a reliable collapsing configuration and a long useful life. Liners that collapse and expand slowly are undesirable. Liners that pinch or otherwise irritate the teat are also undesirable.

Air vents are also used with liners. The air vents are used to prevent the milk in the barrel or short milk tube of the liner from being drawn back towards the teat when the liner expands. An exemplary vent plug is shown in U.S. Pat. No. 6,055,931. A drawback with these types of vent plugs is that the air inlet opening is exposed to the environment under a cow and is frequently clogged by splattering debris (such as manure) from the floor in the milking parlor. Although the clog resistant air vent plug shown in U.S. Pat. No. 6,055,931 is effective, the art desires additional air vent plug designs that do not clog.

SUMMARY OF THE INVENTION

In one embodiment, the invention provides a vent plug for a milking liner wherein the inlet of the vent plug faces in a direction toward the outlet of the vent plug such that it faces the outer surface of the liner. The position of the vent inlet reduces the likelihood that it will become clogged with debris from the floor of the milking parlor.

In another embodiment, the inlet is angled at a nonparallel angle with respect to the longitudinal axis of the vent passage.

Another embodiment of the invention provides a vent plug for a milking liner wherein the vent plug defines a plurality of redundant inlets that allow the vent plug to function if one of the inlets becomes clogged.

A further embodiment of the invention provides a vent plug for a milking liner wherein the vent plug includes an inlet configuration adapted to create a swirling inlet airflow pattern in a vent chamber defined by the vent plug.

In a further embodiment, the invention provides a vent plug configuration that effectively forms seals with the liner to prevent undesirable leaks.

BRIEF DESCRIPTION OF THE DRAWINGS

Similar numbers refer to similar parts throughout the specification.

DETAILED DESCRIPTION OF THE INVENTION

Figure 1:
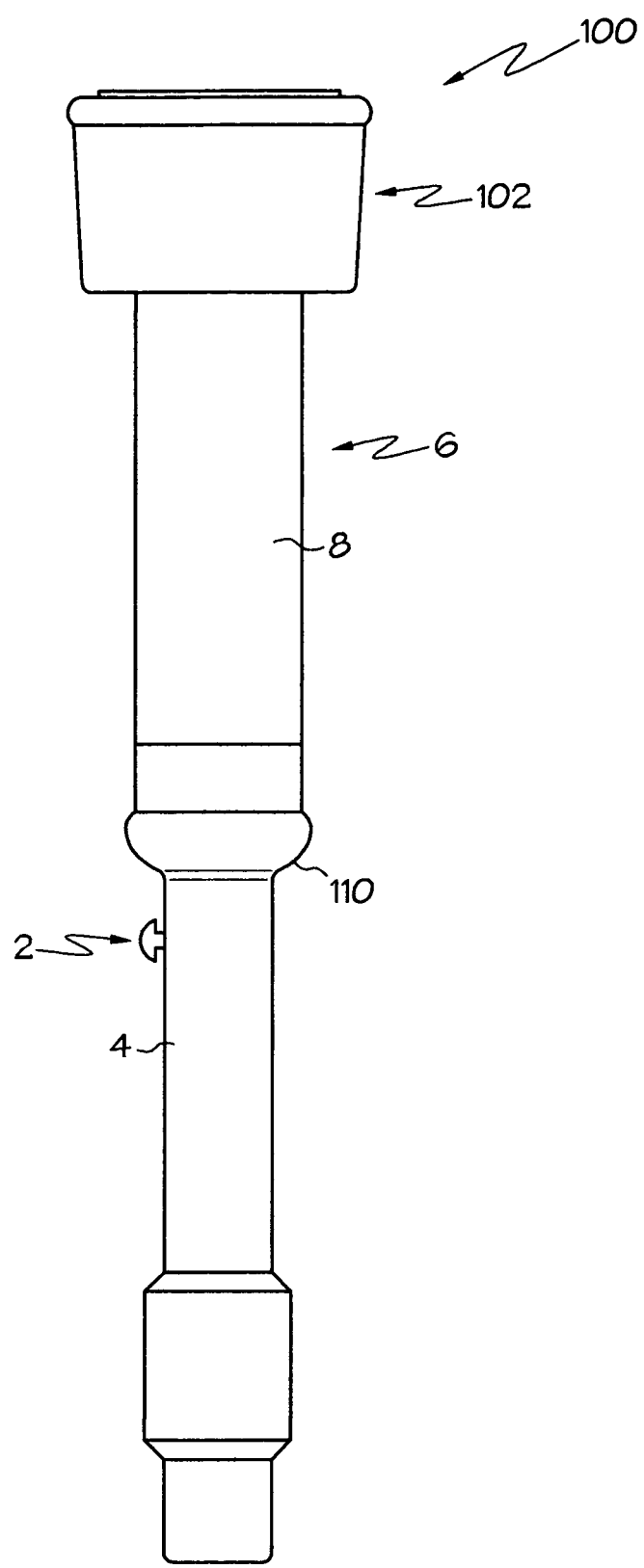
FIG. 1 is an elevation view of a milking liner using the vent plug of the present invention.

The vent plug of the invention is indicated generally by the numeral 2 in the accompanying drawings. Vent plug 2 allows air to be drawn into a short milk tube 4 of a milking liner 6 when a barrel 8 of liner 6 is moving from the collapsed configuration toward the uncollapsed configuration to prevent milk from being drawn back towards barrel 8. In the context of this application, the term "milking liner" or "liner" includes short milk tube 4 regardless of whether short milk tube 4 is integrally formed with barrel 8.

Figure 2:
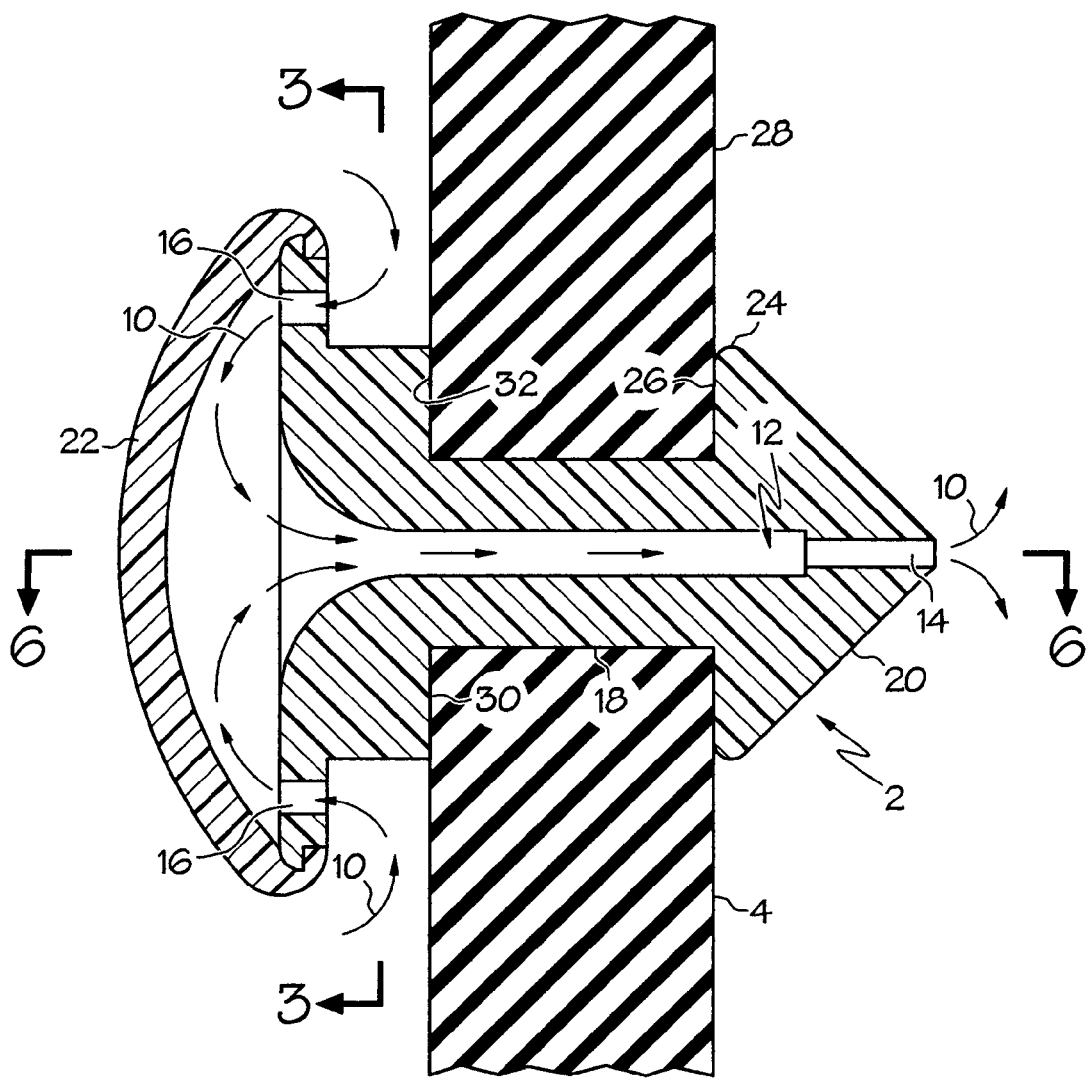
FIG. 2 is a section view of the vent plug of FIG. 1.
Figure 8:
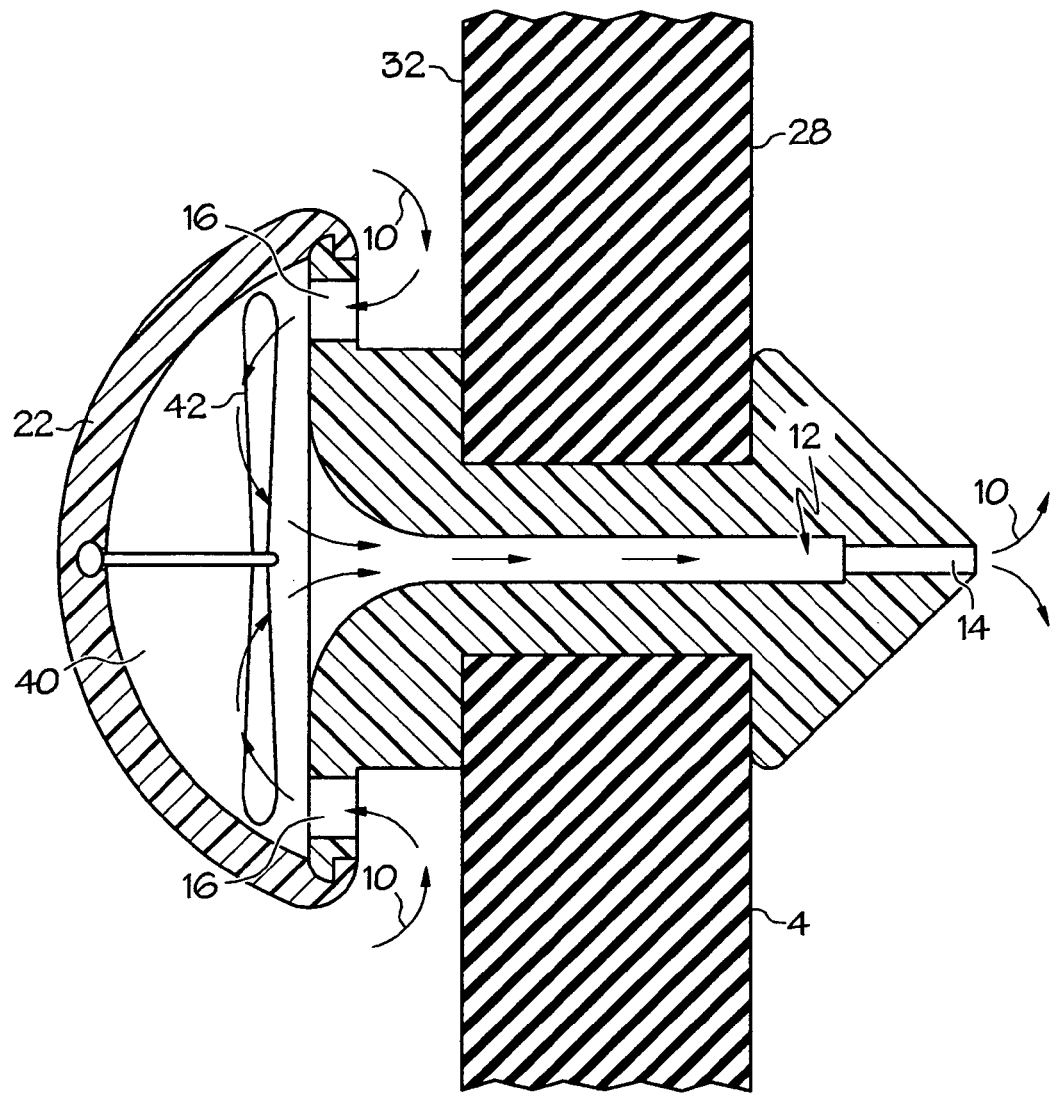
FIG. 8 is a view similar to FIG. 2 showing an alternative embodiment of the vent plug.
Figure 9:
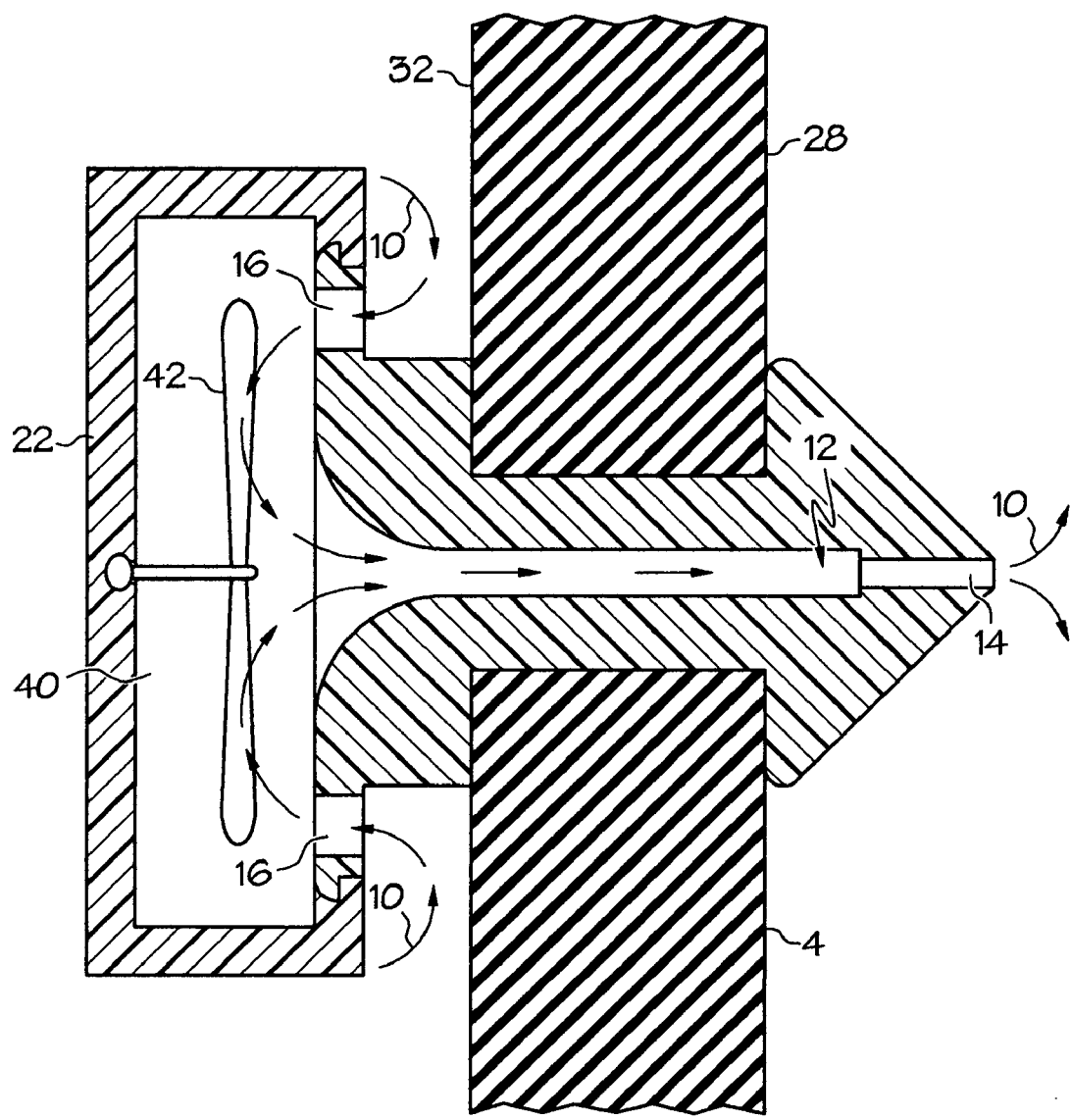
FIG. 9 is a view similar to FIG. 8 showing a further alternative embodiment of the vent plug.

The air being drawn into short milk tube 4 through vent plug 2 is indicated by the numeral 10 in FIGS. 2, 8, and 9. Vent plug 2 defines a vent passage 12 that extends entirely through vent plug 2 such that the passageway defined by short milk tube 4 is in fluid communication with the atmosphere surrounding the outer surface of short milk tube 4. Vent passage 12 includes an outlet 14 adapted to be disposed inside liner 6 and at least one inlet 16 adapted to be positioned outside liner 6. Inlet 16 faces the outer surface of liner 6 such that inlet 16 is protected from debris that may be splashed or splattered against the outer surface of vent plug 2. This inlet 16 configuration requires air 10 to turn through a 180 degree curve before passing through vent plug 2. Inlet 16 is thus disposed between at least a portion of the body of vent plug 2 and a portion of short milk tube 4 or between a portion of the body and outlet 14.

Figure 3:
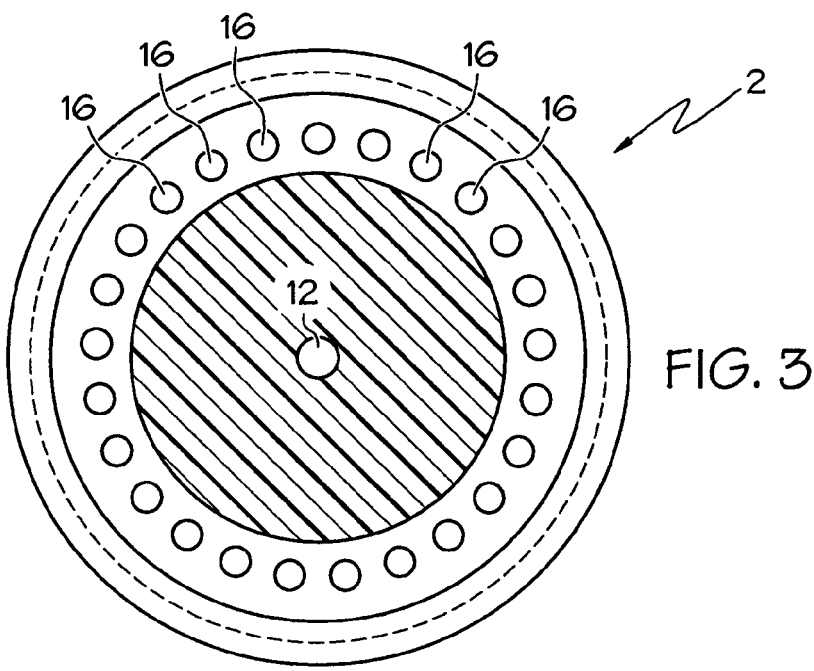
FIG. 3 is a section view taken along 3-3 of FIG. 2 showing one embodiment for the inlets.
Figure 4:
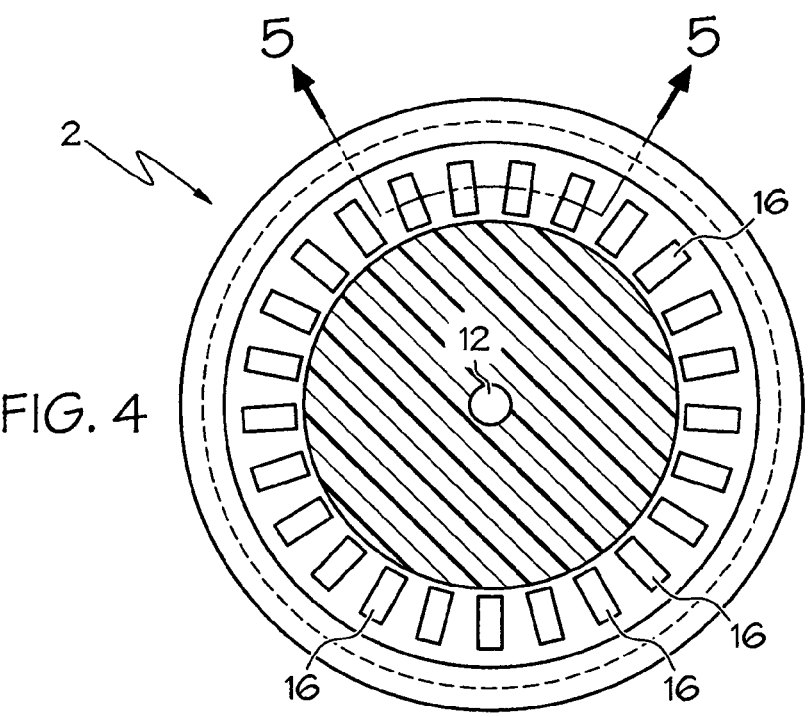
FIG. 4 is a view similar to FIG. 3 showing an alternative embodiment for the inlets.
Figure 5:
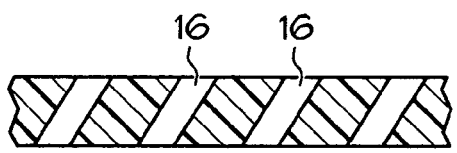
FIG. 5 is a section view showing another alternative embodiment for the inlets.

In the exemplary embodiments of the invention, inlet 16 may be provided in the form of a plurality of inlet holes 16 as shown in FIGS. 3 and 4. The use of more than one inlet hole 16 also makes vent plug 2 less likely to clog. Various inlet configurations are contemplated by the inventors including a single inlet 16 sized the same, smaller than, or larger than outlet 14 or a plurality of inlets 16. Inlet holes 16 may be formed straight through (each having a longitudinal axis normal to the surface) the inwardly-facing body wall of vent plug 2 or may be tilted at an acute angle (such as having longitudinal axis disposed 15 to 75 degrees to the surface) as shown in FIG. 5 to create a swirling air pattern within vent passage 12. The configuration of inlet 16, the use of multiple inlets 16, and the location of inlets 16 between the body of vent plug 2 and the wall of short milk tube 4 makes vent plug 2 difficult to clog.

Figure 6:
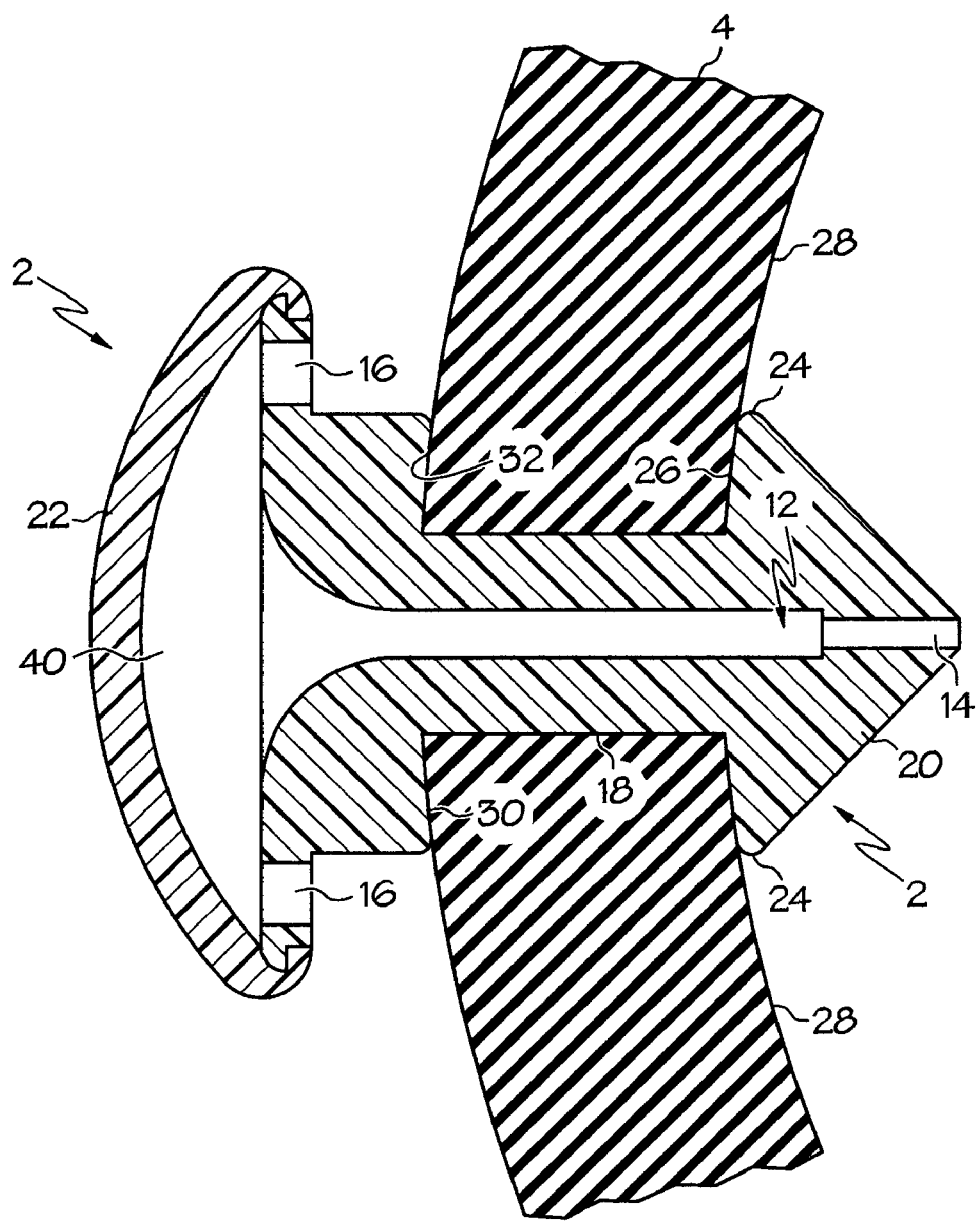
FIG. 6 is a section view taken along line 6-6 of FIG. 2.

The body of vent plug 2 generally includes a body tube 18, an inner flange 20, and an outer flange 22. Inner flange 20 is pointed or in the form of a cone or a pyramid so that it may be forced through the opening defined by short milk tube 4 in order to install vent plug 2. The outer corner 24 of flange 20 may be rounded to help flange 20 fit through the opening of short milk tube 4 so that it does not tear the material of short milk tube 4. As shown in FIG. 6, the outwardly facing surface 26 of inner flange 20 is optionally formed with the same curvature as the inner surface 28 so that a tight seal is formed between flange 20 and short milk tube 4. Similarly, the inwardly facing surface 30 of outer flange 22 has a curvature substantially similar to the curvature of the outer surface 32 of short milk tube 4 so that a tight seal is formed between vent plug 2 and milk plug 4.

Figure 7:
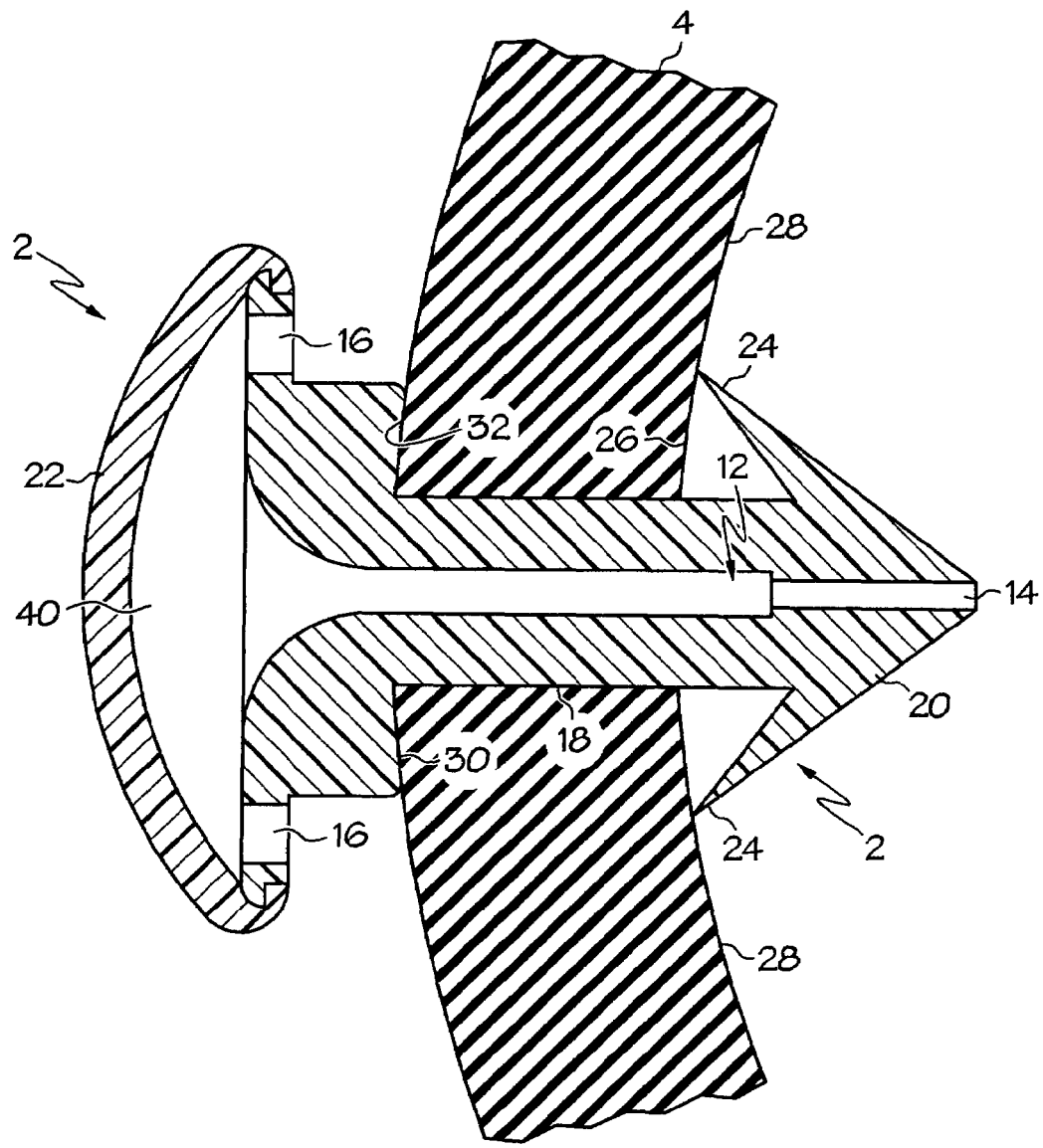
FIG. 7 is a view similar to FIG. 6 showing an alternative flange configuration.

An alternative embodiment of vent plug 2 is depicted in FIG. 7 wherein flange 20 is hook shaped with outer corner 24 being sharply pointed. The sharp outer corner engages inner surface 28 to help prevent vent plug 2 from being unintentionally pulled out of place.

In the exemplary embodiment, outer flange 22 includes two stepped portions. The first stepped portion engages the outer body wall of short milk tube 4. The first stepped portion has a sidewall that defines the distance the second stepped portion is spaced from the outer surface of short milk tube 4. The second stepped portion is spaced from the outer surface of the body wall of short milk tube 4 and provides an overhang that defines and shields inlet 16. Each inlet 16 may be spaced from the sidewall of the first stepped portion as shown in FIGS. 2 and 3. The spacing helps prevent fluid and/or debris flowing down the outer surface of short milk tube 4 from resting on the sidewall of the first stepped portion and directly entering inlet 16.

In the exemplary embodiment, the inner surface of the overhang that defines inlet 16 is disposed 90 degrees with respect to the longitudinal axis of vent plug 2. Inlet 16 thus faces liner 16 or faces toward inner flange 20. In other embodiments, the inner surface of the overhang forms an acute or obtuse angle with the longitudinal axis of vent plug 2 causing inlet 16 to face inwardly at an angle.

In an alternative embodiment of the invention, the first stepped portion defines inlet 16 through its sidewall. When inlet 16 is normal to the sidewall surface, air 10 must turn through a 90 degree curve before passing through vent plug 2. In this alternative embodiment, the second stepped portion may shield inlet 16. In another embodiment, the second stepped portion may be eliminated with only the corner between the outer surface of the stepped portion and the sidewall of the stepped portion protecting and shielding inlet 16. Further, vent passage 12 may be acutely or obtusely angled (with respect to the longitudinal axis of vent plug 2) through the first stepped portion with inlet 16 exiting the sidewall at an angle facing liner 6 or facing away from liner 6.

Outer flange 22 may define a common vent chamber 40 when inlet 16 is in the form of multiple openings. Vent chamber 40 allows all the air 10 to mix from each inlet 16 and allows any debris that enters a single inlet hole 16 to fall to the bottom of vent plug 2 before being sucked through vent passage 12 into short milk tube 4. In the exemplary embodiment, outer flange 22 includes a cap that is snap fit to the body of vent plug 2. In other embodiments, outer flange 22 may be integrally formed. When the cap of outer flange 22 is removable, vent passage 12 may be cleaned by removing the cap and then cleaning passage 12.

Alternative embodiments of vent plug 2 are depicted in FIGS. 8 and 9. In these alternative embodiments, an impeller 42 is rotatably disposed within common vent chamber 40. Impeller 42 freely rotates and is spun by air 10 being pulled through vent plug 2. Impeller 42 can be used to keep chamber 40 clear of debris.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A vent plug for a milking liner; the vent plug comprising:
   a vent plug body defining a vent passage and a common vent chamber;
   the vent passage having an outlet adapted to be disposed inside the milking liner when the vent plug is installed in the milking liner;
   the vent passage having a plurality of inlets adapted to be disposed outside the milking liner when the vent plug is installed in the milking liner;
   the vent plug body including an overhang that is disposed outside the milking liner when the vent plug is installed in the milking liner; the overhang defining the inlet of the vent passage;
   the overhang defining the plurality of inlets; each of the plurality of inlets being in fluid communication with the vent passage and the outlet of the vent passage;
   the common vent chamber being in fluid communication with each of the plurality of inlets and the outlet;
   wherein the inlet and common vent chamber are configured to turn the airflow entering the vent plug body 180 degrees; and
   the inlet being disposed between a portion of the vent plug body and the outlet of the vent passage.

2. The vent plug of claim 1, wherein the common vent chamber is free of a valve ball.

3. A vent plug for a milking liner: the vent plug comprising:
   a vent plug body defining a vent passage;
   the vent passage having an outlet adapted to be disposed inside the milking liner when the vent plug is installed in the milking liner;
   the vent passage having at least one inlet adapted to be disposed outside the milking liner when the vent Plua is installed in the milking liner; and
   the inlet being disposed between a portion of the vent plug body and the outlet of the vent passage;
   the vent plug body including a body tube, and an outer flange, and an inner flange;
   the body tube having an inner end and an outer end;

the outer flange disposed at the outer end of the body tube;

the inner flange disposed at the inner end of the body tube; and the outer flange defining at least one inlet for the vent passage; the at least one inlet facing the liner when the vent plug is installed in the liner.

4. The vent plug of claim 3, wherein the outer flange defines a plurality of spaced inlets for the vent passage; each of the inlets facing the liner when the vent plug is installed in the liner.

5. The vent plug of claim 4, wherein the body tube and outer flange define a common vent chamber; each of the plurality of inlets being in fluid communication with the common vent chamber.

6. The vent plug of claim 5, wherein the common vent chamber is free of a valve ball.

7. The vent plug of claim 5, further comprising a cap connected to the vent plug body.

8. The vent plug of claim 7, wherein the vent plug body defines a plurality of inlets in fluid communication with the vent passage.

9. The vent plug of claim 8, wherein the cap and vent plug body cooperate to define a common vent chamber; each of the inlets and the vent passage being in fluid communication with the common vent chamber.

10. The vent plug of claim 3, wherein the vent passage has a longitudinal axis; the inlet having a longitudinal axis; the longitudinal axis of the inlet being disposed at an acute angle with respect to the longitudinal axis of the vent passage.

11. The vent plug of claim 10, wherein the vent plug body defines a common vent chamber fluidly connecting the inlet to the vent passage; the acute angle of the inlet causes the air drawn into the vent passage to swirl in the common vent chamber.

* * * * *

UNITED STATES PATENT AND TRADEMARK OFFICE
CERTIFICATE OF CORRECTION

PATENT NO. : 7,293,527 B2
APPLICATION NO. : 10/987696
DATED : November 13, 2007
INVENTOR(S) : Shin Page 1 of 1

It is certified that error appears in the above-identified patent and that said Letters Patent is hereby corrected as shown below:

Col 4, line 61, the word "Plua" should be changed to --plug--.

Signed and Sealed this

Twenty-fourth Day of June, 2008

JON W. DUDAS
*Director of the United States Patent and Trademark Office*